Nov. 17, 1942.　　　I. C. ROTHFUSS　　　2,302,259
ORNAMENTAL COVER FOR FLOWER POTS
Filed April 5, 1940　　　3 Sheets-Sheet 1

Ida C. Rothfuss,
Inventor
By Emil Heuchart
Attorney.

Nov. 17, 1942.   I. C. ROTHFUSS   2,302,259
ORNAMENTAL COVER FOR FLOWER POTS
Filed April 5, 1940   3 Sheets-Sheet 2
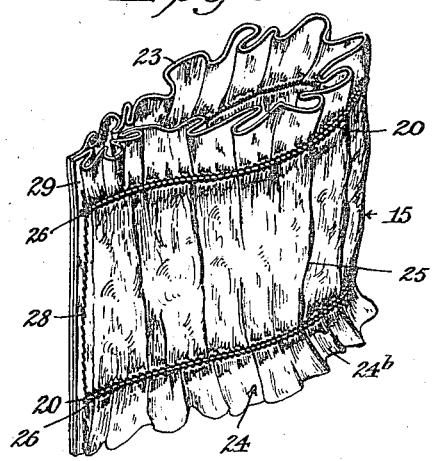
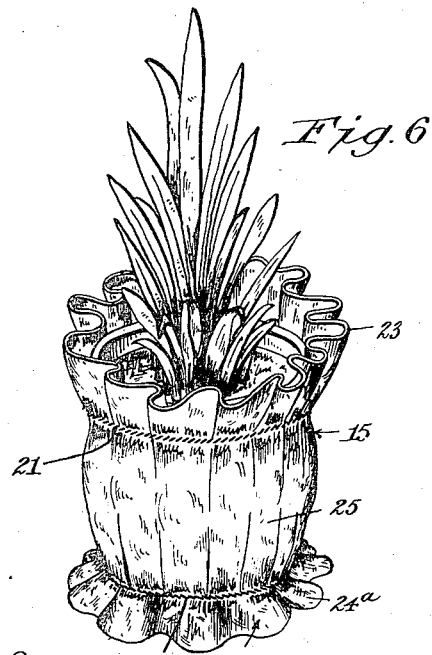
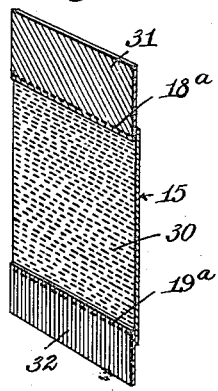
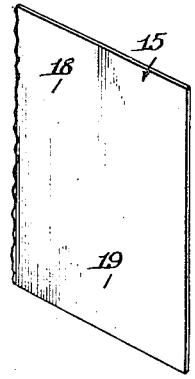
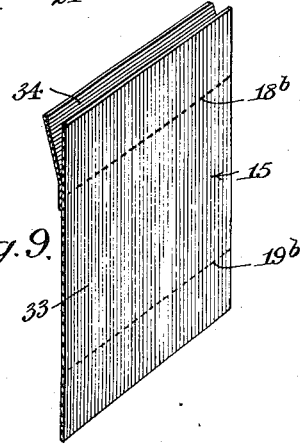
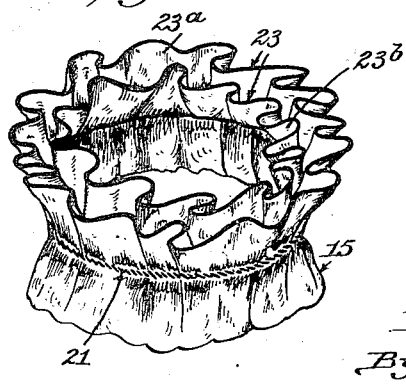
Ida C. Rothfuss, Inventor
By Emil Neuhart, Attorney.

Nov. 17, 1942.　　　I. C. ROTHFUSS　　　2,302,259
ORNAMENTAL COVER FOR FLOWER POTS
Filed April 5, 1940　　　3 Sheets-Sheet 3
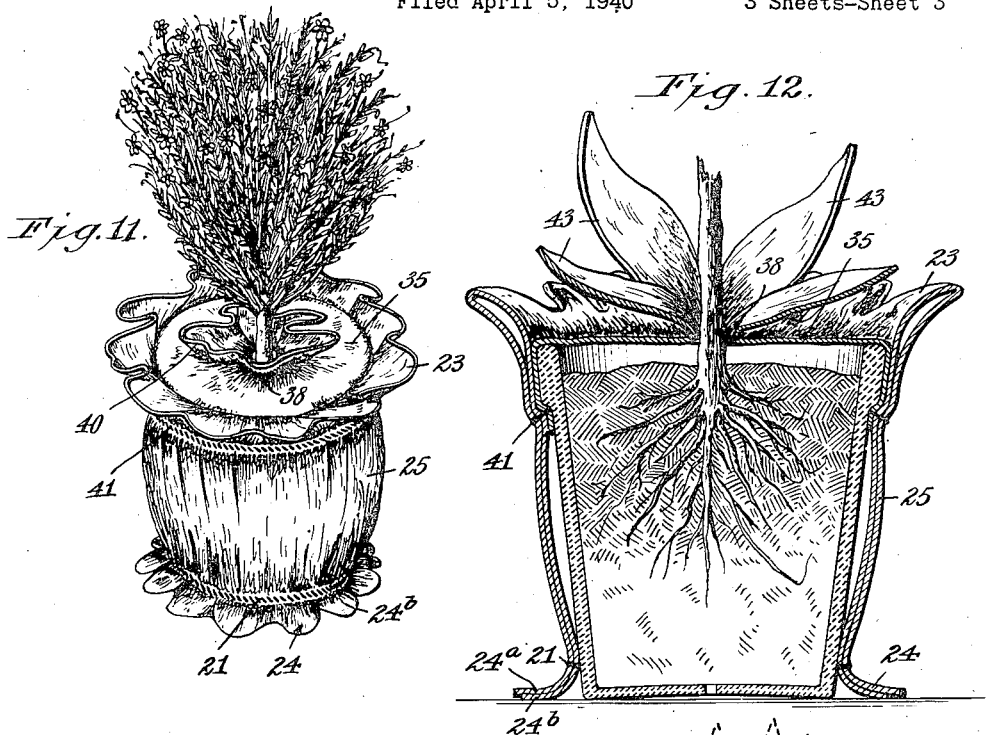
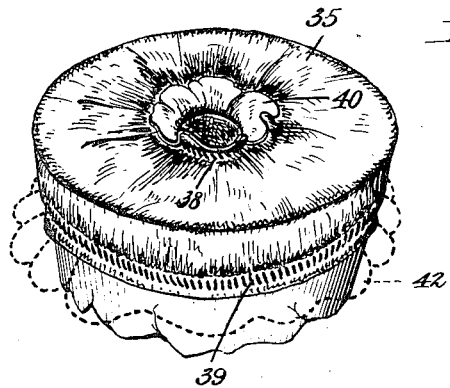
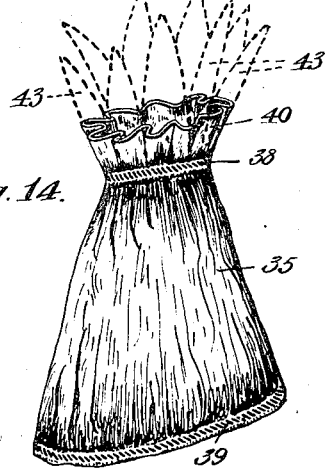
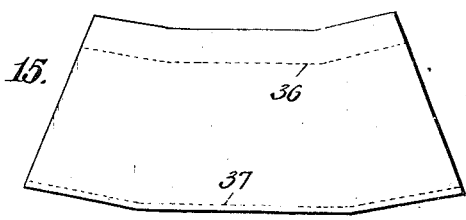
Ida C. Rothfuss,
Inventor.
By Emil Neubach
Attorney.

Patented Nov. 17, 1942

2,302,259

UNITED STATES PATENT OFFICE 2,302,259

ORNAMENTAL COVER FOR FLOWER POTS

Ida C. Rothfuss, Collins, N. Y.

Application April 5, 1940, Serial No. 328,049

21 Claims. (Cl. 41—10)

This invention relates to an ornamental cover for flower pots.

The primary object of my invention is to provide a simple, inexpensive, and attractive cover adapted to surround the conventional type of flower pot in which plants of various kinds are sold, such flower pots being formed of clay or other cheap, unattractive material, necessitated by the fact that the cost of the pot is invariably absorbed in the price obtained for the plant.

Another object of my invention is to provide a cover of this type which is water-resisting and can be easily washed to assure retention of its attractive appearance.

A further object is to provide a cover which is shirred by stitching the same with means including an elastic element so as to enable the cover to be stretched around the pot.

A still further object is to provide a cover of the kind mentioned from a piece or strip of flat material stitched longitudinally by means of threads or cords, including an elastic thread or cord and having the ends of the piece or strip fastened together to make an endless shirred element capable of being stretched around a pot and retained thereon by the inherent elasticity of the stitching.

A still further object of my invention is to provide a cover for flower pots which is endless in form and yieldable circularly so as to surround the flower pot and cleave thereto, and which also has edge flounces and a shirred intermediate portion between said flounces; the stitches, by means of which the shirring is effected, creating both flounces and the shirred intermediate portion and including an elastic thread or cord, the inherent elasticity of which is utilized to grip the pot and retain the cover thereon.

A still further object of my invention is to provide a cover for flower pots in which provision is made for covering the top of the flower pot so as to entirely conceal the soil within the pot while leaving an opening self-adjustable to a size to allow the portion or portions of the plant rising directly from the soil to extend through the cover.

With the above and other objects in view, my invention consists in the novel construction of cover and in the arrangement and combination of parts to be hereinafter described and more particularly pointed out in the subjoined claims.

In the drawings,

Fig. 5 is a perspective view of the cover turned inside out to show opposite ends of the shirred strip stitched together to form the endless cover.

Fig. 6 is a perspective view of a potted plant showing my improved cover surrounding the pot of the same.

Fig. 7 is a sectional perspective view of a built-up piece of material to be utilized in forming the cover, this material comprising three strips of different colors sewed together so as to form a single-ply cover in which the flounces along opposite edges differ in color from each other and from the intermediate portion of the cover.

Fig. 8 is a detached perspective view of a portion of a strip of material from which a cover may be constructed in single-ply form and of any suitable material.

Fig. 9 is a sectional perspective view of a built-up strip or piece of material from which a single-ply cover is to be formed with a double flounce at the top so that the inner flounce may be of a different color or shade than the outer.

Fig. 10 is a perspective view of the upper portion of a cover, showing the same provided with two flounces at the top.

Fig. 11 is a perspective view of a potted plant in which my improved cover is provided with means for concealing the soil within the pot of the plant.

Fig. 12 is a central vertical section through a flower pot showing the lower portion of a plant with its roots embedded in the coil therein, and showing the cover illustrated in Fig. 11 in vertical section with a slight variation in design.

Fig. 13 is a perspective view of the upper portion of a flower pot without a plant therein, showing the manner of covering the soil within the pot and illustrating an opening in the cover through which a plant may project when planted in the soil.

Fig. 14 is a detached perspective view of a portion of the cover, referring more particularly to that portion adapted to conceal the soil within a pot.

Fig. 15 is a plan view of a sheet of pliofilm or other material from which the portion of the cover shown in Fig. 14 is constructed.

Figure 1:
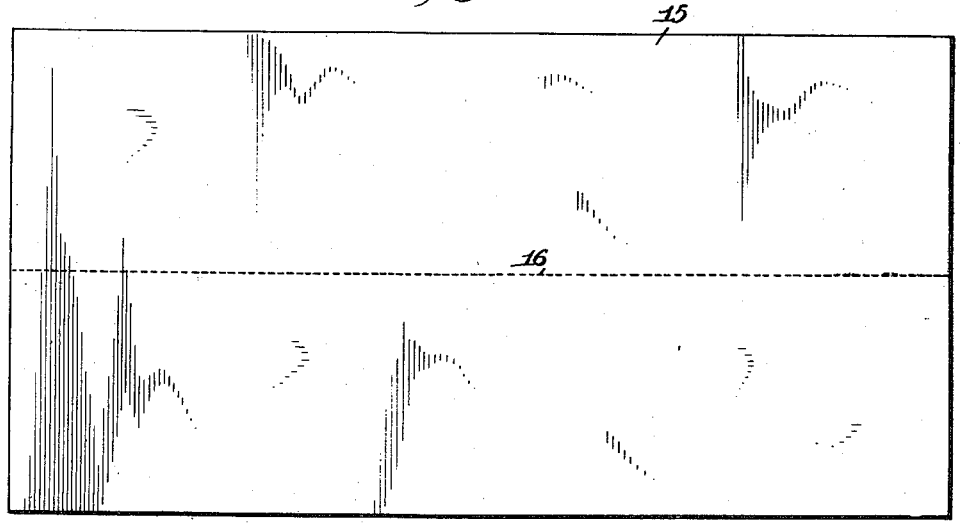
Fig. 1 is a plan view of a piece or strip of material adapted to be fashioned into the form of the cover.

Small flowers and plants, as commonly sold, are planted within clay or other cheap, unattractive flower pots, and these are sometimes surrounded with crepe paper sheets formed of flat interwoven wooden strips or similar flat material when delivering the same to the purchaser or recipient, such covers being folded around the flower pots with the corners forming ears unattractively projecting above the upper edge of the pot, but such covers, by reason of their permeability to water, become easily soiled or broken and are not capable of being renovated by washing. Moreover, a comparatively large sheet of such material is required, due to the rough folding of the same around the pot; and by reason of such sheets being absorbent and extending underneath the pot, watering of the plant results in moisture being drawn into the material and by capillary attraction rising up around the pot. A cover so formed quickly acquires an unsightly appearance, with the result that its removal from the pot becomes necessary and replanting of the plant within an attractive or expensive flower pot is required, provided of course that the plant is to be displayed for its attractive qualities.

While my improved cover may be constructed of various materials, I prefer to employ any of various colors or shades of pliofilm, which is waterproof and can easily be kept in a condition approaching newness. In its preferred construction I take a strip or sheet of pliofilm 15 or other suitable material of substantially the dimensional proportions shown in Fig. 1 of the drawings, and fold the same along the dotted lines 16 in said figure, with the result that the material then has the appearance and assumes the dimensional proportions shown in Fig. 2, wherein it is understood it comprises two plies or layers and is of one-half the width of the original piece or strip, while retaining the full length thereof. I then shir this double-ply strip, designated by the numeral 17, along the dotted lines 18 and 19, shown in said figure, and this shirring is preferably accomplished by using an elastic thread or cord in the shuttle of a sewing machine, and ordinary cotton or other non-elastic thread in the needle of the machine, interweaving or interlocking both together in the common form of stitching effected by a sewing machine of the usual type.

It is not my intention to limit myself to the particular manner in which the shirring-stitches are employed, so long as this stitching is established by the use of an elastic thread in stitching relation to a second thread, which may be either elastic or non-elastic, and therefore will effect the shirring of the material and be elastic to permit stretching of the material, nor is it my intention to limit myself to the number of rows of stitching since this will vary, depending on the size of the cover. This shirring effect created by the stitching results, in one type of cover, in forming two edge ruffled flounces 23, 24, and a shirred intermediate or body portion 25, assuming two rows of stitching are employed.

Figure 2:
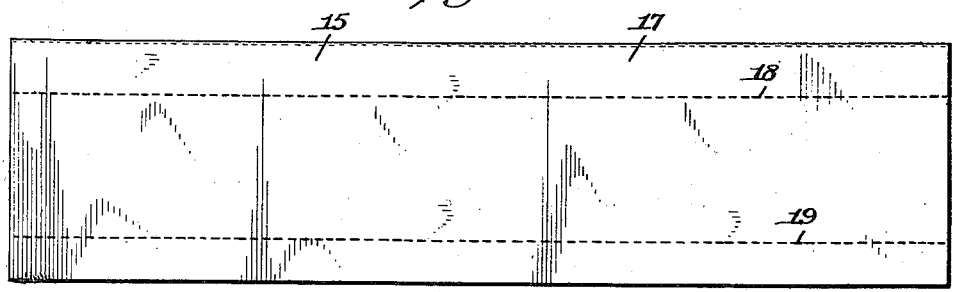
Fig. 2 is a plan view of the same material folded transversely to double the material.
Figure 3:
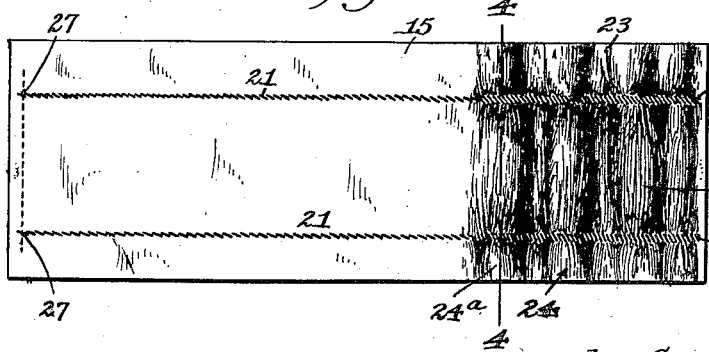
Fig. 3 is a view of the material after being shirred and after establishing the edge flounces thereon by means of stitching which includes an elastic thread or cord, the stitching being shown stretched along a portion of the length of the material to illustrate the latter in flat form, and the remaining portion being shown unstretched to disclose the shirred appearance of the same.
Figure 4:
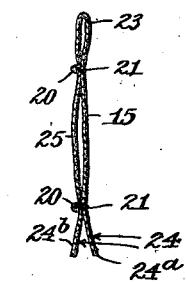
Fig. 4 is a transverse section taken on line 4—4, Fig. 3.

By reason of folding the sheet or strip of material shown in Fig. 1, it may be stated that a two-ply flounce is provided along one of the longitudinal marginal portions of the material, such as the flounce 23 shown in Figs. 3 to 6, inclusive, and two separate flounce-parts 24ª and 24ᵇ for the flounce along the other longitudinal marginal portion. I prefer to use the two-ply flounce as the top of the cover, but if desired two pieces or strips of material of equal size having the dimensional proportions shown in Fig. 2 may be used and shirr-stitched along the dotted lines 18 and 19, in which case two separate flounce-parts 23ª and 23ᵇ would be provided for the flounce 23 at the top of the cover. Or, if desired, the material may be slit from end to end along the fold, or the folded edge cut away, in which case there would also be two separate flounce-parts to the upper flounce of the cover, the inner part being more or less flexed inwardly, while the outer part is flexed outwardly, as shown, for example, in Fig. 10.

It is of course understood that the pot rests on the table, stand, or other foundation provided for it, and that the lower flounce is spread outwardly, as shown in Fig. 6.

These pliofilm covers may be of different colors or shades, and they have a glossy and attractive appearance. When shirred the material may be stretched, as shown at the left in Fig. 3 so that it has substantially a flat appearance approaching that of the material from which the cover was formed. In this figure the right-hand portion remains unstretched and shows the shirring of the intermediate or body portion and the ruffled effect given the flounces at the top and bottom. When this two-ply strip of material is shirred along practically its full length, which is accomplished by stitching from points near one end of the strip, as at 26, to points near the other end thereof, as at 27, a substantially unshirred or flat margin is left at each end of the shirred material, and these two unshirred or flat ends are brought together with the outer face of the shirred material turned in, as shown in Fig. 5, and are stitched together, as indicated at 28, the threads employed for this end stitching being entirely of non-elastic material as it is not the intention that the cover be stretched in the direction of its width or height.

When the ends are thus stitched together, the material becomes endless and it is then turned right side out, which is the form in which it is applied over the pot, the seam formed by the stitching 28 being thus concealed. It is to be noted that the stitching 28 does not extend from edge to edge of the cover, and therefore loose ends 29 are formed at the upper end of this seamed portion. These loose ends overlap when the material is turned right side out and are concealed by the ruffling of adjacent portions of the material. Similar loose ends may be employed at the bottom of the stitching 28, but I prefer to run the stitching 28 to the lower edge of the material, as best shown in Fig. 5.

The cover so formed may be expanded in size to surround a pot larger in diameter than the endless cover when held in circular form without expanding strain exerted thereagainst, with the result that when this cover is stretched or expanded it may be slipped over the pot either from the top or bottom, preferably from the bottom, and will conceal the entire pot when the plant is viewed from the side. When surrounding the pot, the inherent elasticity of the stitching will cause it to contract so that the two shirr-stitched regions will have a gripping effect on the pot and permit the pot to be lifted from its base without any possibility of the cover becoming removed.

In some instances, and particularly for small-size pots, I prefer to construct the cover of single-ply material, such as shown in Fig. 8, and use a single row of stitching, in which case the material would be shirred by the stitching and flounces only would extend in opposite directions from the row of shirr-stitching and no intermediate or shirred body portion be provided. If desired, two or more rows of shirred stitching may be used on the single-ply material when used to form a cover for larger pots.

I also build up material to be shirred with a view of forming a highly aesthetic cover by using different colors or shades of material in the width of the same. In Fig. 7 for example, I show a strip of silver pliofilm material 30 and overlap the upper marginal portion thereof with a narrow strip 31 of similar material colored green, and the lower marginal portion thereof with a strip 32 of similar material colored red. These I fasten together along the dotted lines 18a and 19a by elastically stitching through the overlapped portions so as to form a shirred intermediate or body portion, a green flounce along one edge of this body portion and a red flounce along the other edge thereof. In this manner a unitary structure having three different colors is formed and shirred in the manner described with reference to the preceding figures, and this is treated in the same manner by stitching together the ends of the shirred material so formed. There of course will be a single-ply ruffle at the top and the bottom of the cover.

In Fig. 9 I have shown a full width single-ply piece or strip of material 33 with a narrow strip 34 covering the upper portion of the inner side thereof. These two parts are stitched together along the dotted line 18b in said figure in the manner described with reference to Fig. 7, so that the material will be shirred and a two-part ruffle provided at the top of the material. This material will also be shirred along the dotted line 19b so that a single-ply ruffle will be formed at the bottom of the material. These two parts 33 and 34, when shirr-stitched together, form a unitary structure, and these parts may be of different colors. As shown in Fig. 9, the wider part 33 is red in color while the narrower part 34, forming the inner ruffle part after shirring the material, is green.

The cover is applied to the flower pot so that the lower ruffled flounce extends slightly below the bottom of the pot, while the upper ruffled flounce extends upwardly above the upper edge of the pot, thereby permitting the lower flounce to be flexed outwardly when the pot is placed upon a table or other support, while the upper flounce is flexed outwardly to give the cover an attractive appearance. In the event that the upper flounce is formed of two parts, the inner flounce-part may be flexed inwardly, as shown in Fig. 10, while the outer flounce-part is flexed outwardly. In this manner the soil within the pot is hidden to a considerable extent and the cover material embellished, particularly when the cover is made of two-ply material in which the plies are separate pieces and differently colored, or when an inner flounce-part of a particular color is secured to a single-ply of material of another color which forms the outer flounce-part and the remainder of the cover beneath said outer flounce-part, as for example illustrated in Fig. 9.

In some instances it is desired to entirely conceal the soil within the flower pot, and for this purpose I provide what I term a top piece 35 designed to have a portion thereof lie over the top of the flower pot and a portion surround the rim of the flower pot.

The said top piece I preferably form from a piece of pliofilm or other similar material cut to the shape shown in Fig. 15. I then elastically shirr-stitch the same along the dotted lines 36, 37, after which this shirred material is folded or rolled to bring the opposite ends thereof together for non-elastically stitching the same marginally along their ends, thereby forming the tapered elastically-shirred sleeve-like element shown in Fig. 14, which forms the top piece 35 after turning said sleeve-like element inside out. It is to be noted, therefore, that the elastically-shirred region 38 around the upper portion of this sleeve-like element is shorter than the elastically-shirred region 39 around the lower portion thereof, and that the shirr-stitching around the lower portion is closer to the lower end of this sleeve-like element than the shirr-stitched around the upper portion thereof; thus providing a ruffled flounce 40 around the upper edge of this sleeve-like element. The opening at the upper end of this sleeve-like element is smaller than the opening at the lower end.

This sleeve-like element is utilized to cover the top of the flower pot, as clearly shown in Figs. 11 to 13, and may be employed as a separate element in the manner shown in Fig. 13, or it may be attached to the surrounding or body portion 25 of the flower pot cover, as shown in Fig. 12, in which case the stitching employed for elastically shirring the upper end of said body portion is extended through the lower end of the top piece 35 so that the elastic shirr-stitching around the upper part of the body portion serves to elastically shirr-stitch the top piece thereto, as at 41.

In order to apply the complete cover with its top piece over the flower pot, as shown in Figs. 11 and 12, it is only necessary to stretch the three rows of shirr-stitching and then pass the entire cover over the plant and finally around and over the flower pot, whereupon the row of elastic shirr-stitching 21 at the bottom of the body portion 25 and the elastic shirr-stitching 41 joining the top of the body portion with the lower end of the top piece 35 will surround the flower pot, and the elastic shirr-stitching 38 will be relieved of strain and closely encircle the stem of the plant or such parts of the plant as project upward directly from the soil within the flower pot. This therefore results in surrounding the flower pot in the same manner as provided for in the previous figures of the drawings, and also provides a top piece or covering portion which lies over the top of the soil with the ruffled flounce 40 of the sleeve-like element or top piece 35 extending upwardly and outwardly to provide an attractive embellishment directly around the stem or lower portion of the plant, as clearly shown in Fig. 11.

Where the exterior of a flower pot is glazed or otherwise formed in an artistic manner, the top piece 35 may be employed without the body portion 25. For example, as illustrated in Fig. 13, the exterior of the flower pot may be attractively finished yet be unattractive because of the exposure of the soil therein, and in such cases, the top piece 35 will serve to embellish the upper portion of the flower pot while concealing the soil within the latter. In that event the lower end of the top piece or sleeve-like element 35, which then becomes the outer peripheral portion of the same, may be fashioned as shown in Figs. 13 or 14, or the finish at the bottom may be the same as the top, in which case a ruffled flounce is formed to provide a finish around the lower or outer edge of the top piece, as indicated by dotted lines 42 in Fig. 13. In lieu of the ruffled flounce 40, illustrated in Fig. 14, the top of this sleeve-like element or top piece may be provided with various tapered projections or ears, such as illustrated at 43 in Fig. 12 and shown with dotted lines in Fig. 13.

It is of course understood that other modifications may be resorted to within the scope of the claims appended hereto. For example, when two-ply material of separate sheets is employed, one ply may be of different color than the other, and this would result in two flounces being formed at the top of the cover with the inner flounce of a different color than the outer.

Having thus described my invention, what I claim is:

1. A cover for flower pots adapted to surround a pot and having shirr-stitching between opposite edges thereof to form flounces along the marginal portions of the material forming the cover, such stitching being made elastic by the use of an elastic thread in interlocked relation with a second thread.

2. A cover for flower pots formed endless to surround a pot and having shirr-stitching between opposite edges thereof to form flounces along the marginal portions of the same, said stitching being made elastic by the use of an elastic thread forming part of the stitching so as to permit enlargement of the cover and to cause the cover to cling to said pot by the inherent elasticity of said stitching.

3. A cover for flower pots formed endless to surround a pot and having shirr-stitching between opposite edges thereof to form flounces along the marginal portions of the same, said stitching being made elastic by the use of an elastic thread forming part of the stitching so as to permit the cover to be stretched around a pot and cause said cover to grip the pot under the inherent elasticity of said elastic thread.

4. A cover for flower pots adapted to surround a pot and having two rows of shirr-stitching between opposite edges thereof to form an intermediate shirred portion and ruffled portions at opposite sides of said shirred portion to form top and bottom flounces for the cover, said stitching being made elastic by the use of an elastic thread co-acting with a second thread.

5. A cover for flower pots formed endless to surround a pot and having two rows of shirr-stitching between opposite edges thereof to form an intermediate shirred portion and ruffled portions at opposite sides of said shirred portion and to form top and bottom flounces for the cover, said stitching being made elastic by the use of an elastic thread forming part of the stitching so as to permit the cover to be expanded without destroying the shirred and ruffled effect thereof and to cause the cover to grip the exterior surface of the pot under the inherent elasticity of said stitching.

6. A cover for a flower pot formed of a piece of material folded to provide two plies and shirr-stitched longitudinally in two rows to shirr the material between said stitches and to provide ruffled flounces outside of said two rows of stitches, said stitches being made elastic by the use of an elastic thread serving as part of the stitching, the ends of the material so shirred being fastened together to form an endless cover adapted to surround the pot, said shirr-stitching being yieldable under pressure exerted from the inside of said cover to expand the same and to grip the outer surface of the pot when relieved of such pressure.

7. A cover for a flower pot formed endless and shirred by means of stitching made elastic by the use of an elastic thread interlocked with a second thread to form a shirred portion and a ruffled flounce at the top adapted to extend above the top of the pot, said ruffled flounce being formed of two parts of different colors or shades.

8. A cover for a flower pot formed endless and shirred by means of elastic stitching to form a shirred portion, a ruffled flounce at the top of different color from said shirred portion and a ruffled flounce at the bottom of different color from said first-mentioned flounce and said shirred portion, the inherent elasticity of said stitching serving to retain said cover on the pot.

9. A cover for flower pots formed of an elongated sheet of material stitched lengthwise in two rows from a point near one end of said material to a point near the other end thereof to shirr the material between such points, the stitching so provided being made elastic by use of an elastic thread forming part of said stitching to form ruffled flounces along opposite marginal portions of the material and to provide narrow transverse flat portions at opposite ends of said material to be fastened together to form an endless cover having a shirred intermediate portion and top and bottom ruffled flounces, said cover being adapted to surround a flower pot with a bottom flounce projecting outwardly from the lower end of said pot and the top flounce projecting above the upper end of said pot, the inherent elasticity of said stitching serving to cause the cover to grip the outer peripheral surface of said pot and retain the cover thereto.

10. A cover for flower pots formed of an elongated piece of pliofilm stitched between its longitudinal edges to shirr the same and form a ruffled flounce at the top and a shirred portion beneath said ruffled flounce, said stitching being made elastic by the use of an elastic thread co-acting with a second thread to form the stitching and said shirred material having its ends fastened together to make an endless cover adapted to surround a pot, the inherent elasticity of said stitching being utilized to cause the cover to grip the pot when surrounding the same.

11. A cover for flower pots formed of an elongated piece of pliofilm stitched in two rows to shirr the same between said stitches and form ruffled flounces outside of said stitches, said stitching being made elastic by the use of an elastic thread co-acting with a second thread to form the stitching and the ends of said materials being fastened together to make an endless cover, the inherent elasticity of said stitching being utilized to cause said cover to be gripped around a pot and be retained thereon.

12. A cover for flower pots formed of an elongated piece of material fastened together at its ends to form an endless cover and stitched around said cover to provide a ruffled flounce at the upper end thereof and a shirred region beneath said ruffled flounce, the stitching being made elastic by the use of an elastic thread co-acting with a second thread to form the stitching and the inherent elasticity of said stitching serving to cause the cover to grip a pot when the cover surrounds the latter.

13. A cover for flower pots adapted to surround a pot and extend over the top thereof, comprising an encircling portion elastically shirr-stitched to grip the exterior of the flower pot, and a top piece elastically shirr-stitched near its upper or inner end to closely encircle a portion or portions of a plant extending directly upward from the soil within the flower pot and also encircling the upper portion of the flower pot.

14. A cover for concealing the soil within a flower pot, comprising an endless element narrower at its upper than its lower end and elastically shirr-stitched at spaced-apart regions, said endless element adapted to have the shirr-stitching along its wide region encircle the upper end of a flower pot and the shirr-stitching along its narrow region to closely surround the portion or portions of a plant extending directly upward from the soil within the flower pot.

15. A cover for concealing the soil within a flower pot, comprising an endless element elastically shirr-stitched around its lower end and elastically shirr-stitched near its upper end to provide an embellishing portion extending upwardly from said last-mentioned shirr-stitching, the upper end of said endless element being narrower than the lower, the shirr-stitching along its lower end being adapted to surround the upper portion of a flower pot and the shirr-stitching near its upper end to closely encircle a plant directly above the soil within the flower pot, the portion of said endless element above said last-mentioned shirr-stitching being directed upwardly to form an attractive finish for the cover encircling the lower portion of the plant.

16. A cover for flower pots formed of two endless members shirr-stitched together to join the lower end of one of said members to the other member near its upper end, said last-mentioned member being shirr-stitched near its lower end and the other member being elastically shirr-stitched near its upper or free end, one of the members so joined together being adapted to surround the pot and form a body portion for the cover with its elastic shirr-stitching gripping the pot at its lower end and near its upper end and simultaneously causing the lower end of the other member to grip the upper end of the flower pot and extend inwardly therefrom to cover the soil within the flower pot and to have the elastic shirr-stitching near the free end of said inwardly-extending portion closely encircle the plant where it projects from the soil, the free end portion of said last-mentioned member extending above the last-mentioned shirr-stitching to form an embellishment surrounding said plant.

17. A cover to surround a flower pot, stitched between opposite edges to form a shirred portion and a flounce along at least one side of said shirred portion, the stitching being made elastic to automatically shirr the cover and being formed of an elastic thread co-acting with a second thread.

18. A cover for a flower pot formed endless and shirred by means of stitching made elastic by the use of an elastic thread interlocked with a second thread so as to form a shirred portion adapted to extend around the pot and a ruffled flounce at the top adapted to extend above the top of the pot.

19. An encircling covering element for a flower pot formed of a piece of flexible material stitched along a given line to encircle the pot with such stitching, such stitching being made elastic by the use of an elastic thread interlocked with a second thread to shirr the material in the region beneath said stitching and to provide a flounce above said stitching.

20. A covering element for a flower pot formed of a piece of flexible material stitched along spaced-apart rows to provide a shirred region between said rows and a flounce above the upper row, said stitching being made elastic by the use of an elastic thread interlocked with a second thread, one of said rows of shirr-stitching adapted to encircle and impinge against the upper portion of the flower pot and the other to encircle and impinge against the lower portion of said flower pot.

21. A covering element adapted to be applied around a flower pot and formed of flexible material shirred by the use of stitching formed in part of an elastic thread, said stitching serving to provide the elasticity necessary to cause the cover to impinge firmly against said pot.

IDA C. ROTHFUSS.